US012337785B1

(12) United States Patent
Lee et al.

(10) Patent No.: US 12,337,785 B1
(45) Date of Patent: Jun. 24, 2025

(54) AIRBAG APPARATUS FOR VEHICLE

(71) Applicant: HYUNDAI MOBIS CO., LTD., Seoul (KR)

(72) Inventors: Dong Gil Lee, Yongin-si (KR); Yong Hyun Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/969,055

(22) Filed: Dec. 4, 2024

(30) Foreign Application Priority Data

May 31, 2024 (KR) .................... 10-2024-0071666

(51) Int. Cl.
*B60R 21/207* (2006.01)
*B60R 21/231* (2011.01)
*B60R 21/00* (2006.01)

(52) U.S. Cl.
CPC ...... *B60R 21/207* (2013.01); *B60R 21/23138* (2013.01); *B60R 2021/0048* (2013.01); *B60R 2021/2074* (2013.01); *B60R 2021/23146* (2013.01)

(58) Field of Classification Search
CPC ............... B60R 21/207; B60R 21/213; B60R 21/23138
See application file for complete search history.

(56) References Cited

U.S. PATENT DOCUMENTS

| 9,428,138 B2 * | 8/2016 | Farooq ................. B60R 21/216 |
| 10,974,685 B2 * | 4/2021 | Kwon ................... B60R 21/013 |
| 12,043,197 B1 * | 7/2024 | Deng .................... B60R 21/233 |
| 12,227,139 B2 * | 2/2025 | Deng .................. B60R 21/2338 |

FOREIGN PATENT DOCUMENTS

KR  10-1998-0059459 A  10/1998

* cited by examiner

*Primary Examiner* — Faye M Fleming
(74) *Attorney, Agent, or Firm* — NSIP Law

(57) ABSTRACT

An airbag apparatus for a vehicle includes a position changing portion mounted on a vehicle body and capable of position change, a seat portion mounted on the position changing portion to allow an occupant to sit thereon, a headrest portion mounted on the seat portion to support the occupant's head, a housing portion positioned at the rear of the seat portion, and an airbag portion mounted on the housing portion and deployed to protect the occupant's neck in a vehicle collision.

15 Claims, 10 Drawing Sheets

AIRBAG APPARATUS FOR VEHICLE

CROSS-REFERENCE TO RELATED APPLICATION

This application claims priority from and the benefit under 35 USC § 119 of Korean Patent Application No. 10-2024-0071666, filed on May 31, 2024, in the Korean Intellectual Property Office, the entire disclosure of which is incorporated by reference for all purposes.

BACKGROUND

Field

Exemplary embodiments of the present disclosure relate to an airbag apparatus for a vehicle, and more particularly, to an airbag apparatus for a vehicle, which is deployed to surround the sides and rear of an occupant's head in the event of a rear-end collision, thereby protecting the occupant's neck.

Description of the Related Art

In general, an airbag for a vehicle is installed to protect occupants in the event of a front-end collision. In a conventional airbag for a vehicle, a collision detection sensor mounted on the front bumper of the vehicle detects a collision and transmits a collision signal to an electronic control unit (ECU). The ECU, upon receiving the collision signal, activates the inflator's ignition system installed on the steering wheel of the vehicle, thus expelling compressed gas in the inflator to the outside.

This compressed air that exits to the outside is released through an orifice to inflate an airbag cushion, thereby protecting the occupant's facial area.

However, for the airbag, an airbag apparatus is installed only for a front-end collision and is designed to protect only the occupant's facial area, there is an issue that the back of the occupant's head is not properly protected in the event of an impact in a rear-end collision, resulting in a large loss of life.

In particular, recently, autonomous driving has enabled occupants to change the orientation of seats to various positions, so rear-end collisions may occur depending on the occupant's position. In a rear-end collision, the occupant collides with the headrest due to inertia, and there is an issue that the occupant's neck may be injured if the headrest is damaged by the impact. Therefore, these issues require improvement.

The related art of the present disclosure is disclosed in Korean Patent Application Publication No. 1998-0059459 (published on Oct. 7, 1998, and entitled "REAR-END COLLISION PROTECTION AIRBAG FOR VEHICLE").

SUMMARY

Various embodiments of the present disclosure are directed to providing an airbag apparatus for a vehicle, which is deployed to surround the sides and rear of an occupant's head in the event of a rear-end collision, thereby protecting the occupant's neck.

An airbag apparatus for a vehicle according to the present disclosure includes a position changing portion mounted on a vehicle body and configured to change position, a seat portion mounted on the position changing portion and configured to allow an occupant to sit thereon, a headrest portion mounted on the seat portion and configured to support the occupant's head, a housing portion positioned at the rear of the seat portion, and an airbag portion mounted on the housing portion and configured to deploy to protect the occupant's neck in a vehicle collision.

The seat portion may include a first seat portion configured to support the occupant's hip and a second seat portion connected to the first seat portion and configured to support the occupant's back.

The headrest portion may protrude from the top of the second seat portion.

The housing portion may include a first housing portion positioned at the rear of the seat portion and a second housing portion configured to extend upward from the first housing portion.

The second housing portion may be configured to be adjustable in length.

The airbag portion may include a sensor portion mounted on the vehicle body and configured to detect a collision, an inflator mounted on the housing portion, a cushion portion configured to be deployed by gas injected from the inflator, and a control portion configured to receive a detection signal from the sensor portion and control the inflator.

The cushion portion may include a first cushion portion connected to the inflator, a second cushion portion connected to the first cushion portion and deployed between the housing portion and the headrest portion, and a third cushion portion deployed forward from the second cushion portion to cover both sides of the occupant's head.

A lateral length of the second cushion portion may be greater than a lateral length of the headrest portion.

The second cushion portion may be in close contact with a roof of the vehicle body.

A second non-slip portion may be disposed on the second cushion portion and in close contact with the roof and to restrict movement.

A pair of the third cushion portions may be connected to a front of the second cushion portion and deployed toward the occupant.

A distance between the pair of the third cushion portions may be greater than the lateral length of the headrest portion.

The third cushion portion may be in close contact with the roof of the vehicle body.

A third non-slip portion may be disposed on the third cushion portion and in close contact with the roof and to restrict movement.

The cushion portion may further include a strap portion configured to connect the second cushion portion with the housing portion and guide deployment of the third cushion portion.

The airbag apparatus for a vehicle according to the present disclosure allows for various changes in the position and orientation of the seated occupant in the seat portion through the position changing portion. The airbag portion, which is deployed from the housing portion positioned at the rear of the seat portion, is capable of supporting both sides of the occupant's head and the headrest portion, thereby protecting the occupant's neck.

DETAILED DESCRIPTION

Embodiments of an airbag apparatus for a vehicle according to the present disclosure will be described hereinafter with reference to the accompanying drawings. For clarity and convenience in description, thicknesses of lines, sizes of constituent elements, and the like may be illustrated in a non-exact proportion in the drawings. In addition, the terms used below are defined in consideration of the functions thereof in the present disclosure and may vary depending on the intention of a user or an operator or common practice. Therefore, these terms should be contextually defined in light of the present specification.

Figure 1:
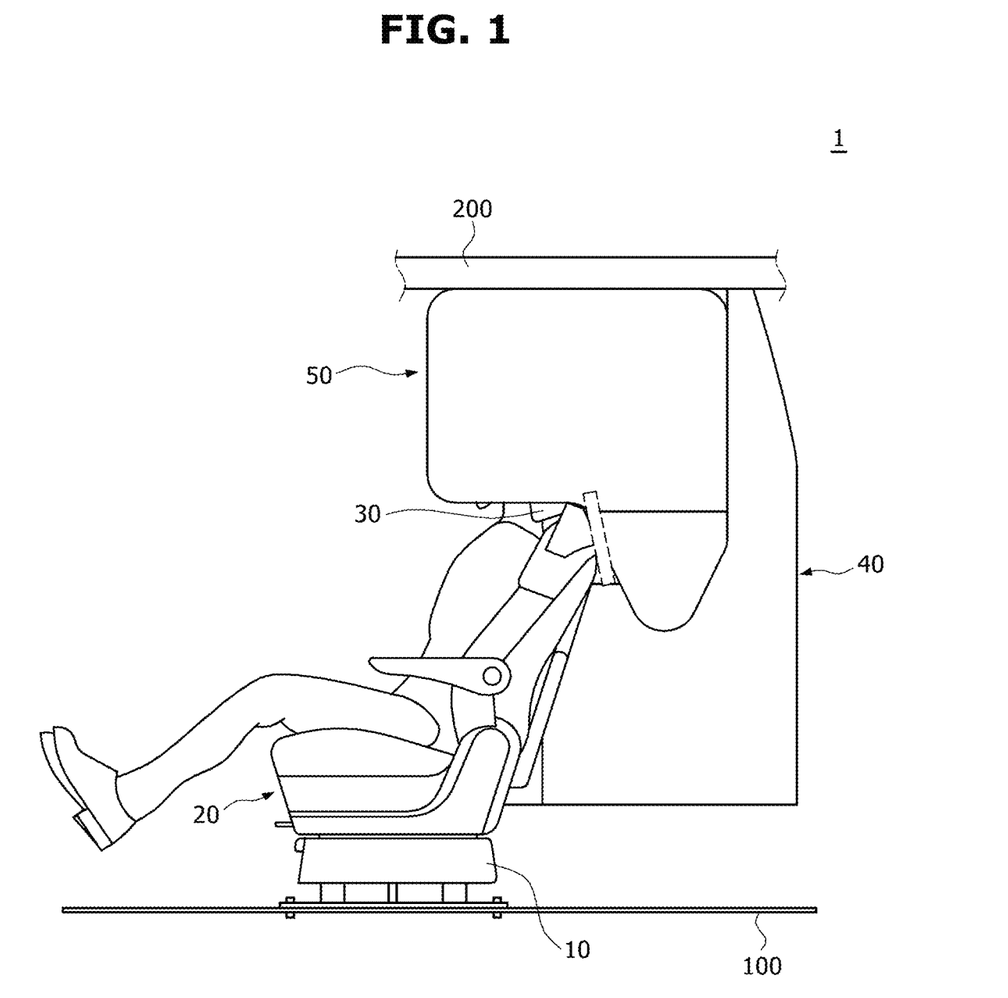
FIG. 1 is a view schematically showing an airbag apparatus for a vehicle according to an embodiment of the present disclosure.

FIG. 1 is a view schematically showing an airbag apparatus for a vehicle according to an embodiment of the present disclosure. Referring to FIG. 1, an airbag apparatus 1 for a vehicle according to an embodiment of the present disclosure includes a position changing portion 10, a seat portion 20, a headrest portion 30, a housing portion 40, and an airbag portion 50.

The position changing portion 10 may be mounted on a vehicle body 100 and capable of position change. For example, the position changing portion 10 may move along rails provided on the vehicle body 100. The position changing portion 10 may be rotated around a rotation axis. In other words, an occupant may be moved back and forth and rotated as needed to face other occupants by the position changing portion 10.

The seat portion 20 may be mounted on the position changing portion 10 and allow the occupant to sit thereon. For example, the seat portion 20 may be mounted on the top of the position changing portion 10. In addition, the position changing portion 10 may be provided at the bottom of the seat portion 20.

The headrest portion 30 may be mounted on the seat portion 20 and support the occupant's head. For example, the headrest portion 30 may be adjusted in height to align with the height of the occupant's head. The headrest portion 30 may include a cushioning material.

The housing portion 40 may be positioned at the rear of the seat portion 20. For example, the housing portion 40 may be connected to the seat portion 20 and extend rearward from the rear surface of the seat portion 20. In addition, the housing portion 40 may be mounted on the vehicle body and positioned at the rear of the seat portion 20. The housing portion 40 may be formed of resin.

The airbag portion 50 may be mounted on the housing portion 40 and deployed to protect the occupant's neck in the event of a vehicle collision. For example, the airbag portion 50 may support the headrest portion 30 to prevent the occupant's neck from twisting due to damage to the headrest portion 30. In addition, the airbag portion 50 may support both sides of the occupant's head to prevent the occupant's neck from twisting.

Figure 2:
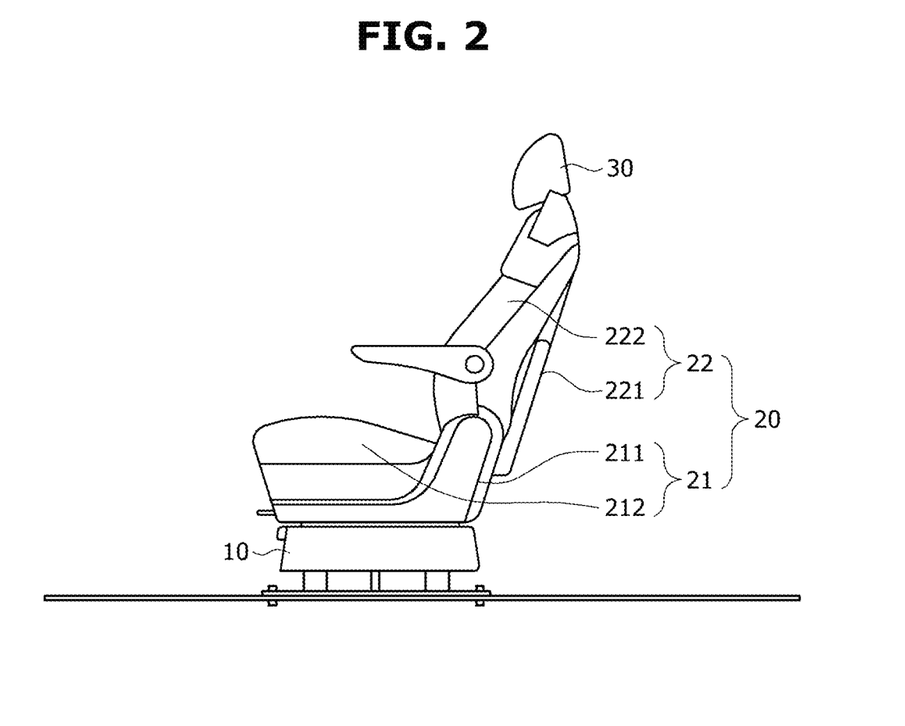
FIG. 2 is a view schematically showing a seat portion according to an embodiment of the present disclosure.

FIG. 2 is a view schematically showing a seat portion according to an embodiment of the present disclosure. Referring to FIG. 2, the seat portion 20 according to an embodiment of the present disclosure may include a first seat portion 21 and a second seat portion 22.

The first seat portion 21 may support the occupant's hip. For example, the first seat portion 21 may be mounted on the position changing portion 10 and linked with the position changing portion 10. The first seat portion 21 may include a first seat fixing portion 211 coupled to the position changing portion 10 and formed of metal, and a first seat cushioning portion 212 coupled to the first seat fixing portion 211 and formed of a cushioning material.

The second seat portion 22 may be connected to the first seat portion 21 and support the occupant's back. For example, the second seat portion 22 may include a second seat fixing portion 221 coupled to the first seat fixing portion 211 and formed of metal, and a second seat cushioning portion 222 coupled to the second seat fixing portion 221 and formed of a cushioning material.

The headrest portion 30 may protrude from the top of the second seat portion 22. For example, the headrest portion 30 may be inserted into a groove formed in the second seat fixing portion 221 and adjusted in height. The headrest portion 30 may support the occupant's neck or back of the head.

Figure 3:
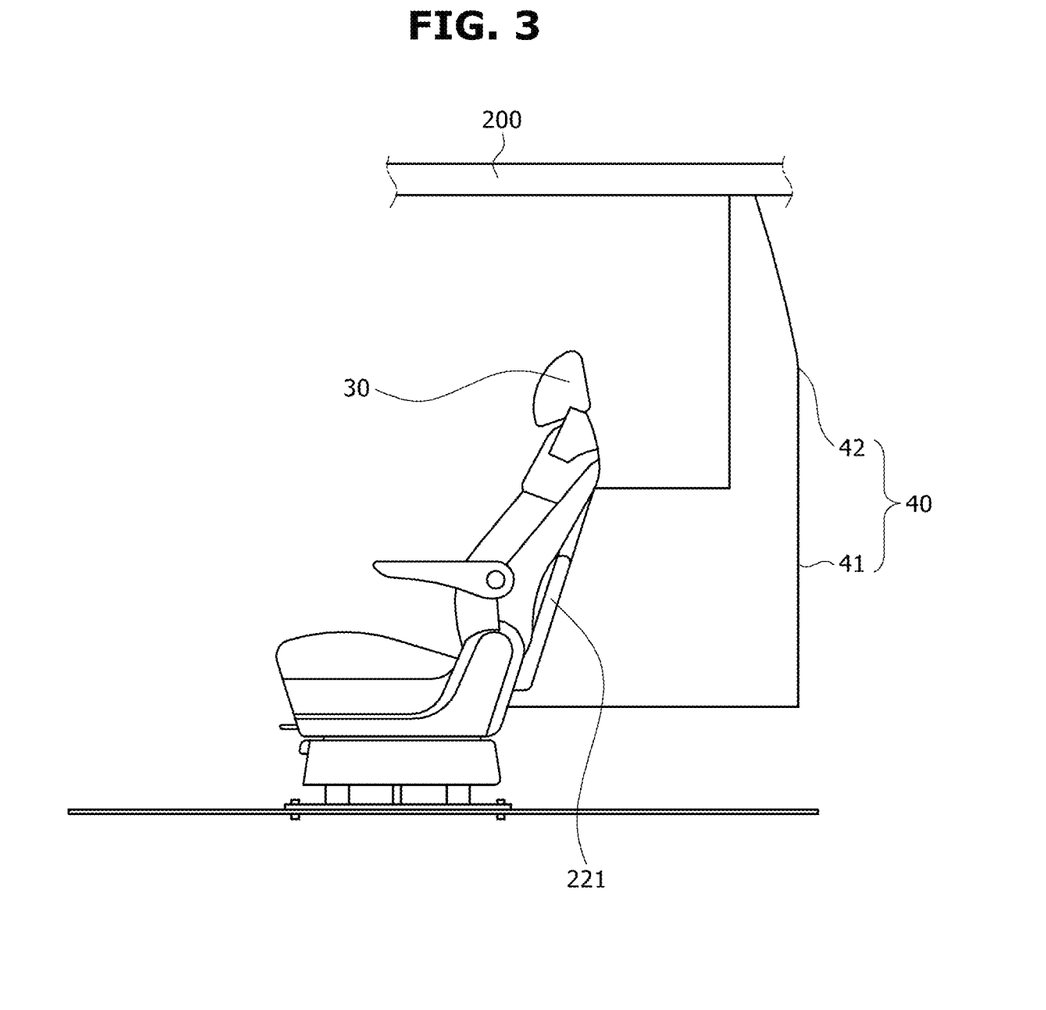
FIG. 3 is a view schematically showing a housing portion according to an embodiment of the present disclosure.

FIG. 3 is a view schematically showing a housing portion according to an embodiment of the present disclosure. Referring to FIG. 3, the housing portion 40 according to an embodiment of the present disclosure may include a first housing portion 41 and a second housing portion 42.

The first housing portion 41 may be positioned at the rear of the seat portion 20. For example, the first housing portion 41 may be made separately from the seat portion 20 and connected to the seat portion 20 or may be integrated with the seat portion 20 and extended rearward from the seat portion 20. In addition, the first housing portion 41 may be fixedly installed on the vehicle body. The first housing portion 41 may be assembled to the second seat fixing portion 221 or formed integrally therewith. The highest point of the housing portion 41 may be positioned lower than the lowest point of the headrest portion 30.

The second housing portion 42 may extend upward from the first housing portion 41. For example, the second housing portion 42 may extend upward from the first housing portion 41. The second housing portion 42 may be close to or in close contact with a roof 200. The second housing portion 42 may be spaced apart from the headrest portion 30.

The second housing portion 42 may be adjustable in length. For example, the second housing portion 42 may increase or decrease in length vertically. When the length of the second housing portion 42 increases, the second housing portion 42 may be in close contact with the roof 200 to secure the seat portion 20 and block debris from passing through the airbag portion 50 and reaching the occupant in the event of a collision. When the length of the second housing portion 42 decreases, the second housing portion 42 may be spaced apart from the roof 200, allowing for position adjustment of the seat portion 20 through the position changing portion 10. In addition, the second housing portion 42 may move horizontally. The second housing portion 42 may move horizontally along a rail formed in the first housing portion 41 to adjust the distance with the headrest portion 30. When the distance between the second housing portion 42 and the headrest portion 30 is adjusted according to the occupant's seating position, the forward deployment speed of the airbag portion 50 deployed therebetween may be adjusted.

Figure 4:
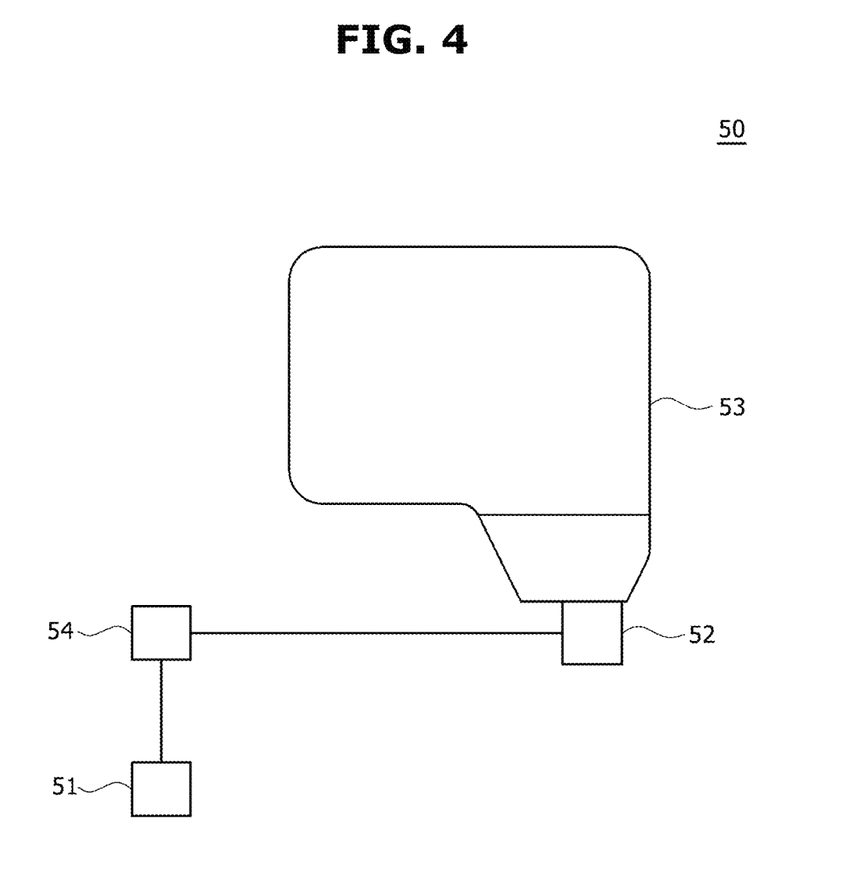
FIG. 4 is a view schematically showing an airbag portion according to an embodiment of the present disclosure.

FIG. 4 is a view schematically showing an airbag portion according to an embodiment of the present disclosure. Referring to FIG. 4, the airbag portion 50 according to an embodiment of the present disclosure may include a sensor portion 51, an inflator portion 52, a cushion portion 53, and a control portion 54.

The sensor portion 51 may be mounted on the vehicle body 100 and detect collisions. For example, the sensor portion 51 may be evenly positioned on the front, side, and rear of the vehicle body 100 to detect whether the vehicle body 100 is in a collision.

The inflator portion 52 may be mounted on the housing portion 40. For example, the inflator portion 52 may be housed in the first housing portion 41. The inflator portion 52 may be ignited by an ignition signal to release gas.

The cushion portion 53 may be deployed by gas injected from the inflator portion 52. For example, the cushion portion 53 may inflate through the surface of the first housing portion 41 during an initial deployment.

The control portion 54 may control the inflator portion 52 by receiving a detection signal from the sensor portion 51. When the sensor portion 51 detects a collision and transmits a detection signal to the control portion 54, the control portion 54 that receives the detection signal may ignite the inflator portion 52. This allows the inflator portion 52 to release gas.

The inflator portion 52 and cushion portion 53 may be housed in a groove formed in the first housing portion 41 and covered with leather or fabric that forms the surface of the first housing portion 41. In addition, the inflator portion 52 and cushion portion 53 may be housed in an airbag case, and the airbag case may be mounted in a groove formed in the first housing portion 41. The airbag case may align with the surface of the first housing portion 41, and the cushion portion 53 may be deployed through the airbag case.

Figure 5:
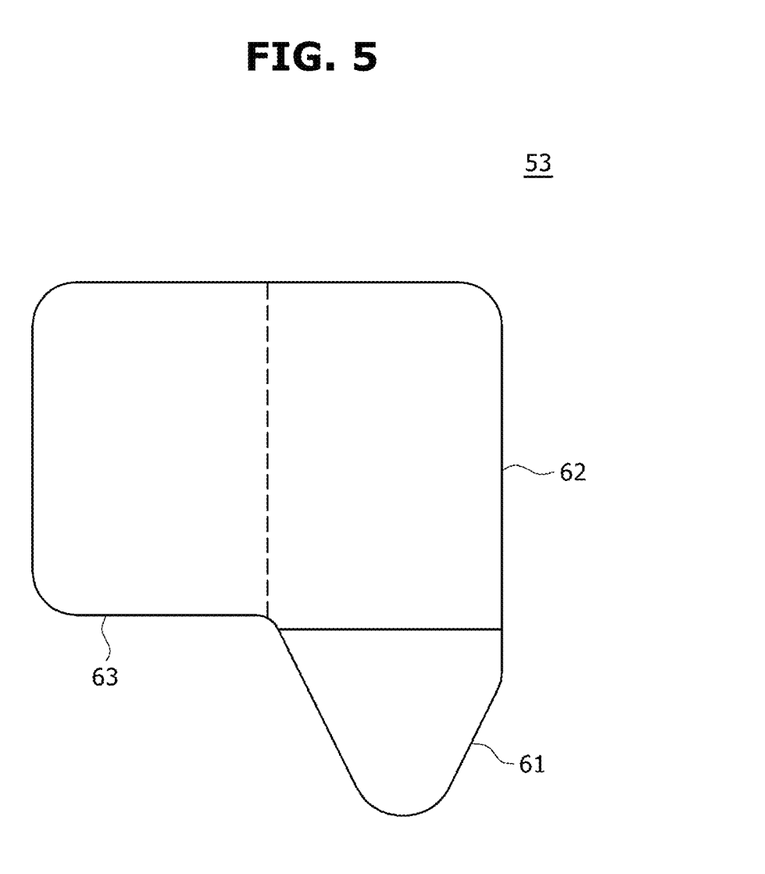
FIG. 5 is a side view schematically showing a cushion portion according to an embodiment of the present disclosure.
Figure 6:
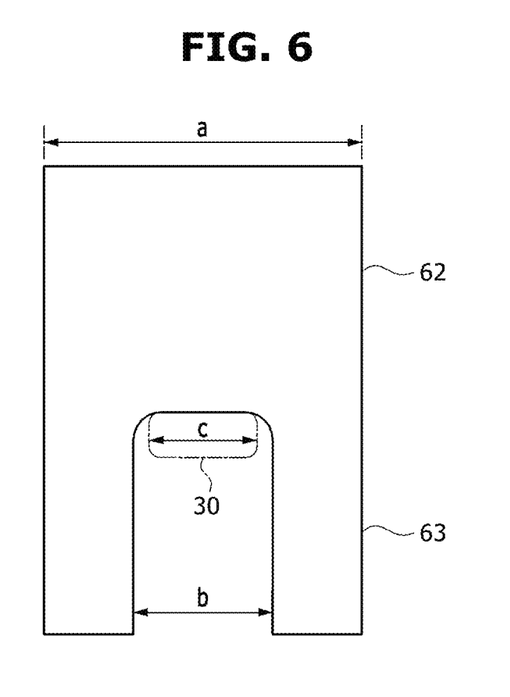
FIG. 6 is a plan view schematically showing a cushion portion according to an embodiment of the present disclosure.
Figure 7:
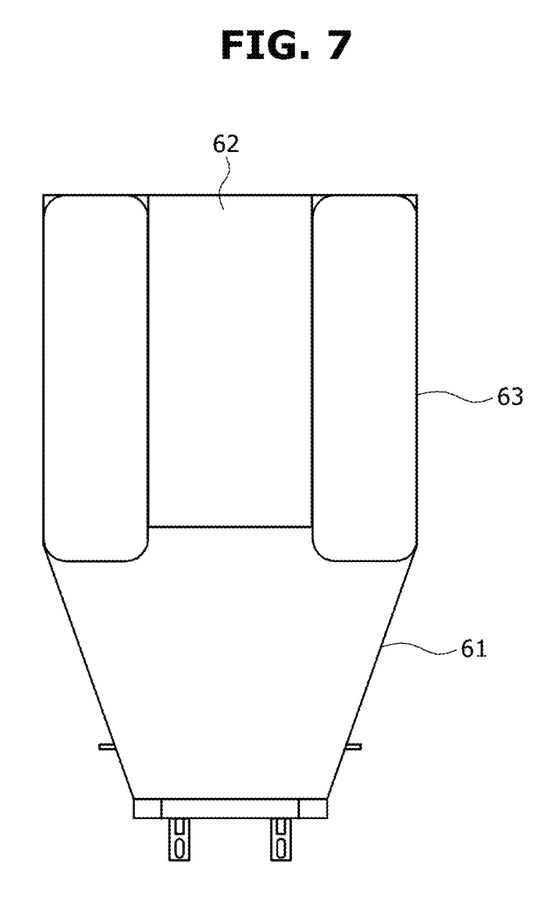
FIG. 7 is a front view schematically showing a cushion portion according to an embodiment of the present disclosure.
Figure 8:
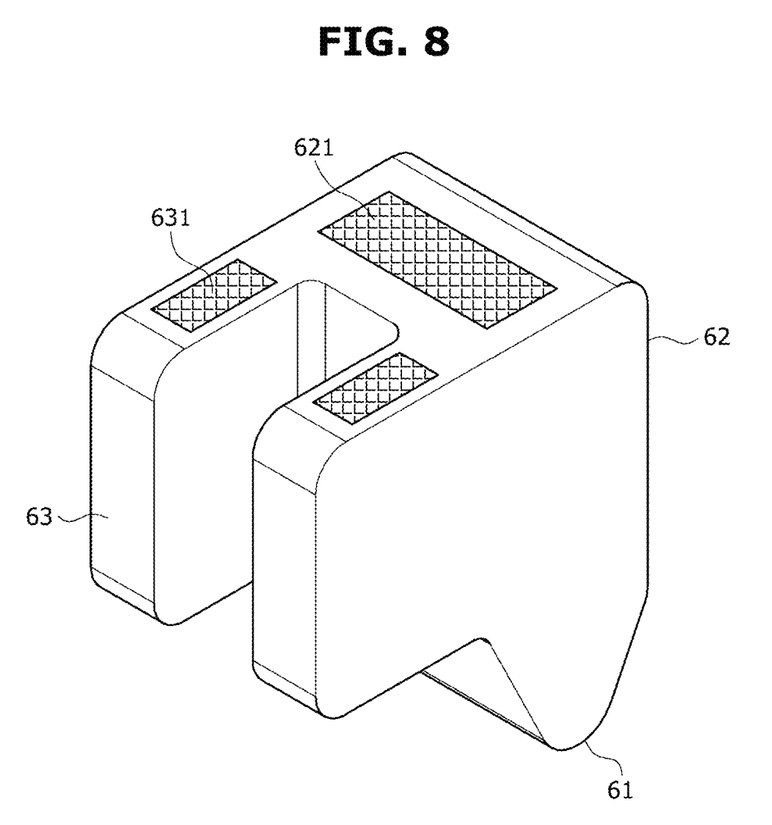
FIG. 8 is a perspective view schematically showing a cushion portion according to an embodiment of the present disclosure.

FIG. 5 is a side view schematically showing a cushion portion according to an embodiment of the present disclosure. FIG. 6 is a plan view schematically showing a cushion portion according to an embodiment of the present disclosure. FIG. 7 is a front view schematically showing a cushion portion according to an embodiment of the present disclosure. FIG. 8 is a perspective view schematically showing a cushion portion according to an embodiment of the present disclosure. Referring to FIGS. 5 to 8, the cushion portion 53 according to an embodiment of the present disclosure may include a first cushion portion 61, a second cushion portion 62, and a third cushion portion 63. For example, the first cushion portion 61, the second cushion portion 62, and the third cushion portion 63 may each be made of fabric and bonded together. In addition, the first cushion portion 61, the second cushion portion 62, and the third cushion portion 63 may be integrally cut. The first cushion portion 61, the second cushion portion 62, and the third cushion portion 63 may be made of various materials that may be inflated to protect the occupant. The first cushion portion 61, the second cushion portion 62, and the third cushion portion 63 may be overlapped for storage and inflated when gas is supplied.

The first cushion portion 61 may be connected to the inflator portion 52, and the second cushion portion 62 may be connected to the first cushion portion 61. The first cushion portion 61 may be deployed to a height corresponding to the highest point of the second seat portion 22. The second cushion portion 62 may be deployed between the housing portion 40 and the headrest portion 30. The third cushion portion 63 may be connected to the second cushion portion 63 and deployed forward from the second cushion portion 62 to cover both sides of the occupant's head. When the first cushion portion 61, the second cushion portion 62, and the third cushion portion 63 are fully deployed, they cover the rear and the right and left sides of the occupant's head to prevent the occupant's neck from twisting.

The lateral length a of the second cushion portion 62 may be designed to be longer than the lateral length c of the headrest portion 30. The lateral length a of the second cushion portion 62 may be the width of the second cushion portion 62 when fully deployed.

The second cushion portion 62 may be in close contact with the roof 200 of the vehicle body 100. For example, the distance between the first housing portion 41 and the roof 200 may correspond to the sum of the vertical lengths of the first cushion portion 61 and the second cushion portion 62. The second cushion portion 62 may be in close contact with the roof 200 and movement thereof may be restricted. In addition, the second cushion portion 62 may remain inflated between the headrest portion 30 and the second housing portion 42, thereby supporting the headrest portion 30.

A second non-slip portion 621 may be formed on the second cushion portion 62 to be in close contact with the roof 200 and restrict movement. When the second cushion portion 62 is deployed, an upper portion of the second cushion portion 62 may be in close contact with the roof 200. The second non-slip portion 621 may be formed in an area of the second cushion portion 62 that is in close contact with the roof 200. The second non-slip portion 621 may be attached to a surface of the second cushion portion 62 and include a non-slip shape and material. In addition, the second cushioning portion 62 itself may be made of a non-slip shape and material.

The distance b between a pair of third cushion portions 63 is longer than the lateral length c of the headrest portion 30. For example, the third cushion portion 63 may protrude from both sides of the front of the second cushion portion 62.

The third cushion portion 63 may be in close contact with the roof 200 of the vehicle body 100. For example, the distance between the second seat portion 22 and the roof 200 may correspond to the vertical length of the third cushion portion 63. The third cushion portion 63 may be in close contact with the roof 200 and movement thereof may be restricted.

A third non-slip portion 631 may be formed on the third cushion portion 63 to be in close contact with the roof 200 and restrict movement. When the third cushion portion 63 is deployed, an upper portion of the third cushion portion 63 may be in close contact with the roof 200. The third non-slip portion 631 may be formed in an area of the third cushion portion 63 that is in close contact with the roof 200. The third non-slip portion 631 may be attached to a surface of the third cushion portion 63 and include a non-slip shape and material. In addition, the third cushioning portion 63 itself may be made of a non-slip shape and material.

Figure 9:
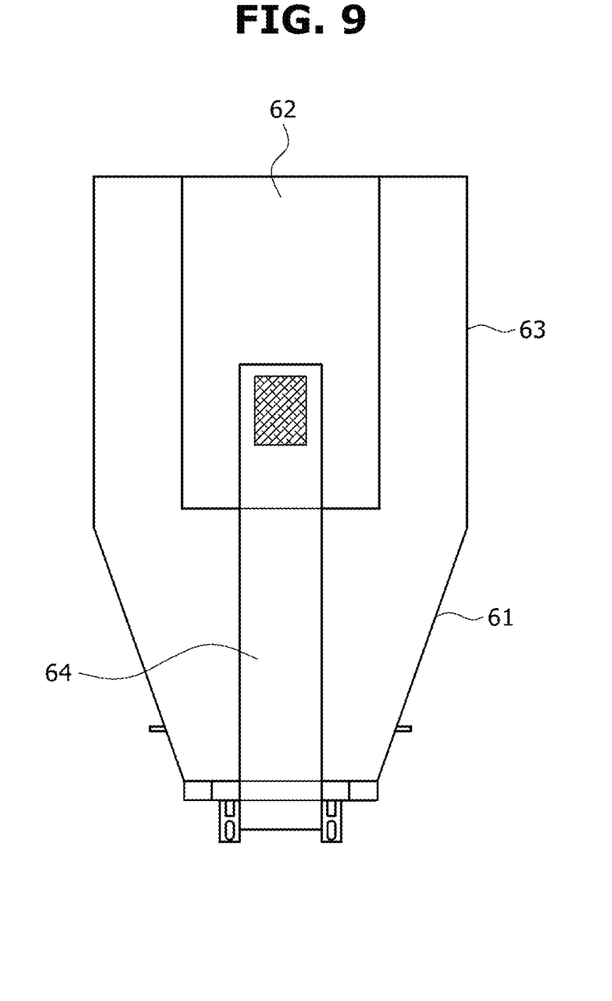
FIG. 9 is a view schematically showing a strap portion according to an embodiment of the present disclosure.

FIG. 9 is a view schematically showing a strap portion according to an embodiment of the present disclosure.

Referring to FIG. 9, a cushion portion 53 according to an embodiment of the present disclosure may further include a strap portion 64. The strap portion 64 may connect the second cushion portion 62 with the housing portion 40 and guide the deployment of the third cushion portion 63. For example, one end of the strap portion 64 may be secured to the first housing portion 41, and the other end may be coupled to the second cushion portion 62. One end of the strap portion 64 may be secured by hooking onto a loop formed on the first housing portion 41 or adhered using an adhesive.

When the strap portion 64 is exposed to the outside, one end of the strap portion 64 may be fixedly installed on a top surface of the first housing portion 41. The other end of the strap portion 64 may be bonded or stitched to an outer surface of the second cushion portion 62, which is positioned between the pair of third cushion portions 63.

When the strap portion 64 is housed in the cushion portion 53, one end of the strap portion 64 may be fixedly installed on an inner wall of the first housing portion 41, where the inflator portion 52 is housed. The other end of the strap portion 64 may be bonded or stitched to an inner surface of the second cushion portion 62.

Figure 10:
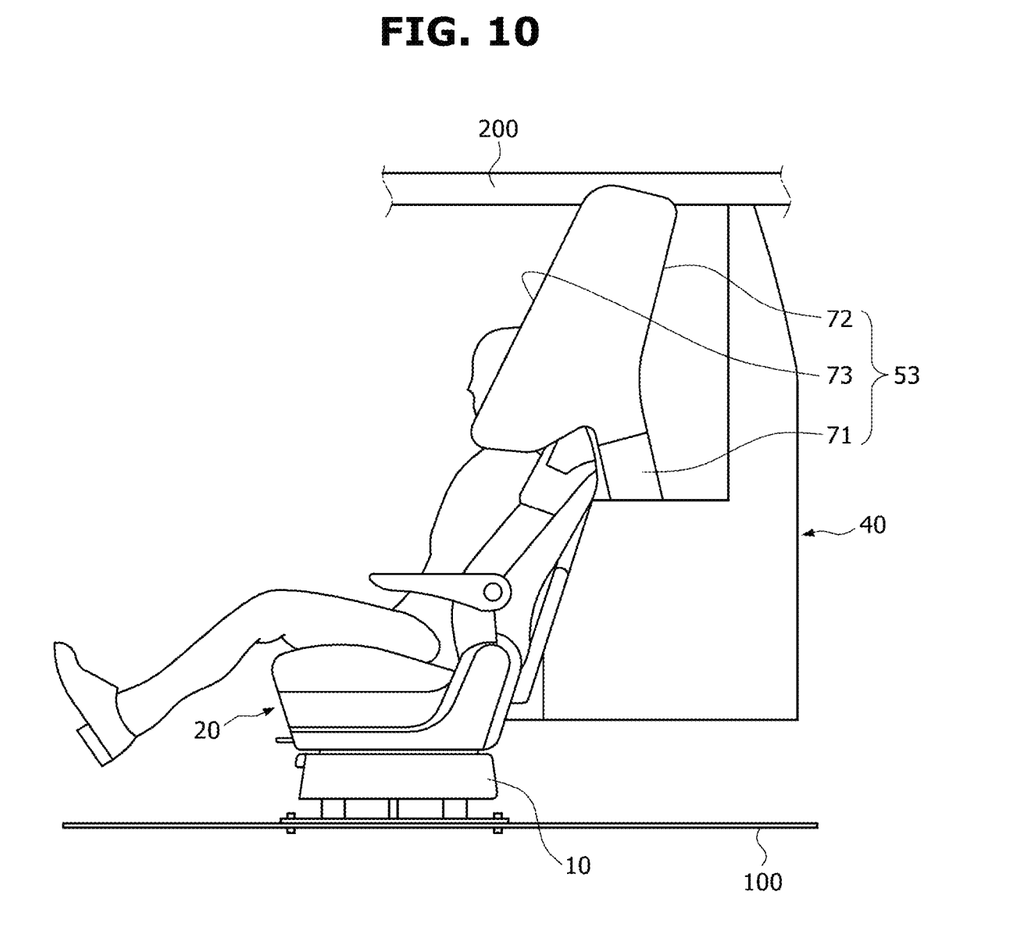
FIG. 10 is a view schematically showing a cushion portion according to another embodiment of the present disclosure.

FIG. 10 is a view schematically showing a cushion portion according to another embodiment of the present disclosure. Referring to FIG. 10, the cushion portion 53 according to another embodiment of the present disclosure may include a first deployment portion 71, a second deployment portion 72, and a third deployment portion 73. The first deployment portion 71 may be connected to the inflator portion 52. Since the components excluding the cushion portion 53 in FIG. 10 are the same as those in FIG. 1, a detailed description of these components will be omitted.

The second deployment portion 72 may be deployed to a height corresponding to the highest point of the second seat portion 22. The second deployment portion 72 may be deployed toward the headrest portion 30 in an inclined manner. The second deployment portion 72 may be connected to the first deployment portion 71. The second deployment portion 72 may be deployed between the housing portion 40 and the headrest portion 30. The second deployment portion 72 may support the headrest portion 30. The second deployment portion 72 may be deployed toward the roof 200 in an inclined manner. The third deployment portion 73 may be connected to the second deployment portion 72 and deployed forward from the second deployment portion 72 to cover both sides of the occupant's head. The lower portion of the third deployment portion 73 may be deployed downward toward the occupant's shoulder in an inclined manner. The third deployment portion 73 may protrude forward from the upper portion to the lower portion, forming an inclined surface. When the first cushion portion 71, the second cushion portion 72, and the third cushion portion 73 are fully deployed, they cover the rear and the right and left sides of the occupant's head to prevent the occupant's neck from twisting.

The operation of an airbag apparatus 1 for a vehicle having the above-described configuration according to an embodiment of the present disclosure will be described as follows.

The headrest portion 30 mounted on the seat portion 20 supports the occupant's neck and head, and the housing portion 40 mounted on the seat portion 20 protrudes toward the rear of the seat portion 20. The seat portion 20 may be moved back and forth or rotated by the position changing portion 10. The airbag portion 50 includes the sensor portion 51 that detects a vehicle collision, the inflator portion 52 mounted on the housing portion 40, the cushion portion 53 connected to the inflator portion 52, and the control portion 54 that initiates the ignition of the inflator portion 52.

In other words, when the sensor portion 51 detects an impact on the vehicle body 100, the inflator portion 52 is ignited under the control of the control portion 54, and the cushion portion 53 is deployed by gas released from the inflator portion 52.

The cushion portion 53 includes the first cushion portion 61, the second cushion portion 62, and the third cushion portion 63. When gas is injected, the first cushion portion 61 is deployed upward, and the second cushion portion 62, connected to the first cushion portion 61, reaches the roof 200. In this case, the second cushion portion 62 is deployed between the second housing portion 42 and the headrest portion 30, thereby supporting the headrest portion 30. Furthermore, the pair of third cushion portions 63 connected to the second cushion portion 62 are deployed toward the occupant and cover both sides of the occupant's head. The third cushion portion 63 may prevent the occupant's neck from twisting and be positioned above the occupant's shoulder to restrict upward movement of the occupant.

The strap portion 64, which is a component of the cushion portion 53, has both ends connected to the housing portion 40 and the second cushion portion 62. This strap portion 64 may restrict upward movement during the initial deployment of the second cushion portion 62, thereby guiding the third cushion portion 63 to deploy quickly toward the occupant. The strap portion 64 may separate from the second cushion portion 62 under additional pressure, thereby guiding further upward deployment of the second cushion portion 62. In addition, a part of the strap portion 64 may be overlapped and stitched. The stitched area may tear, thus increasing the length of the strap portion 64. This may guide further upward deployment of the second cushion portion 62.

The airbag apparatus 1 for a vehicle according to an embodiment of the present disclosure allows for various changes in the position and orientation of the seated occupant in the seat portion 20 through the position changing portion 10. The airbag portion 50, which is deployed from the housing portion 40 positioned at the rear of the seat portion 20, is capable of supporting both sides of the occupant's head and the headrest portion 30, thereby protecting the occupant's neck.

Although embodiments of the present disclosure have been described with reference to the accompanying drawings, these embodiments are for illustrative purposes only, and those skilled in the art will appreciate that various modifications and other equivalent embodiments can be made from these embodiments disclosed herein. Thus, the true technical scope of the disclosure should be defined by the following claims.

What is claimed is:

1. An airbag apparatus for a vehicle, the airbag apparatus comprising:
    a position changing portion mounted on a vehicle body and configured to change position;
    a seat portion mounted on the position changing portion and configured to allow an occupant to sit thereon;
    a headrest portion mounted on the seat portion and configured to support the occupant's head;
    a housing portion positioned at a rear of the seat portion; and
    an airbag portion mounted on the housing portion and configured to deploy to protect the occupant's neck in a vehicle collision.

2. The airbag apparatus of claim 1, wherein
the seat portion includes:
a first seat portion configured to support the occupant's hip; and
a second seat portion connected to the first seat portion and configured to support the occupant's back.

3. The airbag apparatus of claim 2, wherein the headrest portion protrudes from a top of the second seat portion.

4. The airbag apparatus of claim 1, wherein
the housing portion includes:
a first housing portion positioned at the rear of the seat portion; and
a second housing portion configured to extend upward from the first housing portion.

5. The airbag apparatus of claim 4, wherein the second housing portion is configured to be adjustable in length.

6. The airbag apparatus of claim 1, wherein
the airbag portion includes:
a sensor portion mounted on the vehicle body and configured to detect a collision;
an inflator mounted on the housing portion;
a cushion portion configured to be deployed by gas injected from the inflator; and
a control portion configured to receive a detection signal from the sensor portion and control the inflator.

7. The airbag apparatus of claim 6, wherein
the cushion portion includes:
a first cushion portion connected to the inflator;
a second cushion portion connected to the first cushion portion and deployed between the housing portion and the headrest portion; and
a third cushion portion deployed forward from the second cushion portion to cover both sides of the occupant's head.

8. The airbag apparatus of claim 7, wherein a lateral length of the second cushion portion is greater than a lateral length of the headrest portion.

9. The airbag apparatus of claim 7, wherein the second cushion portion is in close contact with a roof of the vehicle body.

10. The airbag apparatus of claim 9, wherein a second non-slip portion is disposed on the second cushion portion and in close contact with the roof and configured to restrict movement.

11. The airbag apparatus of claim 7, wherein a pair of the third cushion portions is connected to a front of the second cushion portion and deployed toward the occupant.

12. The airbag apparatus of claim 11, wherein a distance between the pair of the third cushion portions is greater than a lateral length of the headrest portion.

13. The airbag apparatus of claim 11, wherein the third cushion portion is in close contact with a roof of the vehicle body.

14. The airbag apparatus of claim 13, wherein a third non-slip portion is disposed on the third cushion portion and in close contact with the roof and configured to restrict movement.

15. The airbag apparatus of claim 7, wherein
the cushion portion further includes
a strap portion configured to connect the second cushion portion with the housing portion and guide deployment of the third cushion portion.

* * * * *